US012699672B2

(12) United States Patent
Yang et al.

(10) Patent No.: US 12,699,672 B2
(45) Date of Patent: Aug. 4, 2026

(54) SINGLE-WIRE COMMUNICATION METHOD AND SINGLE-WIRE COMMUNICATION SYSTEM

(71) Applicant: Silergy Semiconductor Technology (Hangzhou) LTD, Hangzhou (CN)

(72) Inventors: Yuanyu Yang, Hangzhou (CN); Xiaoqiang Xu, Hangzhou (CN); Jianxin Wang, Hangzhou (CN)

(73) Assignee: Silergy Semiconductor Technology (Hangzhou) LTD., Hangzhou (CN)

( * ) Notice: Subject to any disclaimer, the term of this patent is extended or adjusted under 35 U.S.C. 154(b) by 0 days.

(21) Appl. No.: 18/619,393

(22) Filed: Mar. 28, 2024

(65) Prior Publication Data

US 2024/0330232 A1 Oct. 3, 2024

(30) Foreign Application Priority Data

Mar. 31, 2023 (CN) ........................ 202310341164.X

(51) Int. Cl.
*G06F 13/20* (2006.01)
*G06F 13/40* (2006.01)
*G06F 13/42* (2006.01)

(52) U.S. Cl.
CPC ...... *G06F 13/4282* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 9,760,322 B2 * | 9/2017 | Hamada | H04L 41/0806 |
| 10,356,824 B2 | 7/2019 | Qiao et al. | |
| 2012/0239841 A1 * | 9/2012 | Trifonov | G06F 13/4282 |
| | | | 710/110 |
| 2016/0205066 A1 * | 7/2016 | Attarwala | H04L 61/5038 |
| | | | 709/208 |
| 2023/0010116 A1 * | 1/2023 | Lynch | A61B 5/02 |
| 2023/0065241 A1 * | 3/2023 | Suzuki | H04L 12/40 |
| 2023/0179668 A1 | 6/2023 | Lin et al. | |

\* cited by examiner

*Primary Examiner* — Henry Tsai
*Assistant Examiner* — Dean Phan

(57) ABSTRACT

A single-wire communication method for a single-wire communication system having a master device and a plurality of slave devices, where the master device and each of the plurality of slave devices are sequentially connected through a single wire, the method can include: sequentially transmitting an addressing command to each of the plurality of slave device by the master device, where each of the plurality of slave devices when receiving the addressing command serves as a current slave device; setting an address of the current slave device as address data of the received addressing command when the current slave device has not been addressed; and transmitting the received addressing command to a next slave device when the current slave device has been addressed.

14 Claims, 5 Drawing Sheets

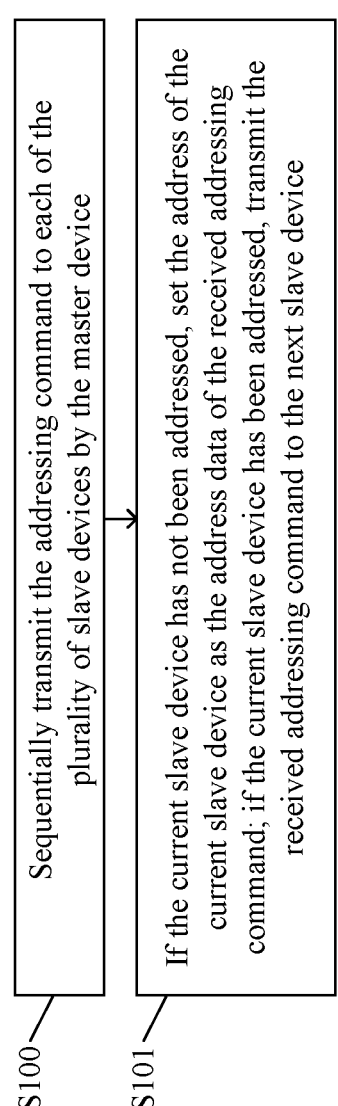

S100 — Sequentially transmit the addressing command to each of the plurality of slave devices by the master device S101 — If the current slave device has not been addressed, set the address of the current slave device as the address data of the received addressing command; if the current slave device has been addressed, transmit the received addressing command to the next slave device

FIG. 5

SINGLE-WIRE COMMUNICATION METHOD AND SINGLE-WIRE COMMUNICATION SYSTEM

RELATED APPLICATIONS

This application claims the benefit of Chinese Patent Application No. 202310341164.X, filed on Mar. 31, 2023, which is incorporated herein by reference in its entirety.

FIELD OF THE INVENTION

The present invention generally relates to the field of communications, and more particularly to single-wire communications systems and methods.

BACKGROUND

In modern technology, communication is vital function among different Currently, main communication is wired communication and/or wireless equipment, communication. Traditional wired communication can be serial communication and/or parallel communication. Serial communication may be applied to long-distance communication, and the parallel communication applied to short-distance communication. Single-wire communication may serve as one of the serial communication types, with advantages of fewer pins and wiring resources.

BRIEF DESCRIPTION OF THE DRAWINGS

FIG. 5 is a flow diagram of an example single-wire communication method, in accordance with embodiments of the present invention.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
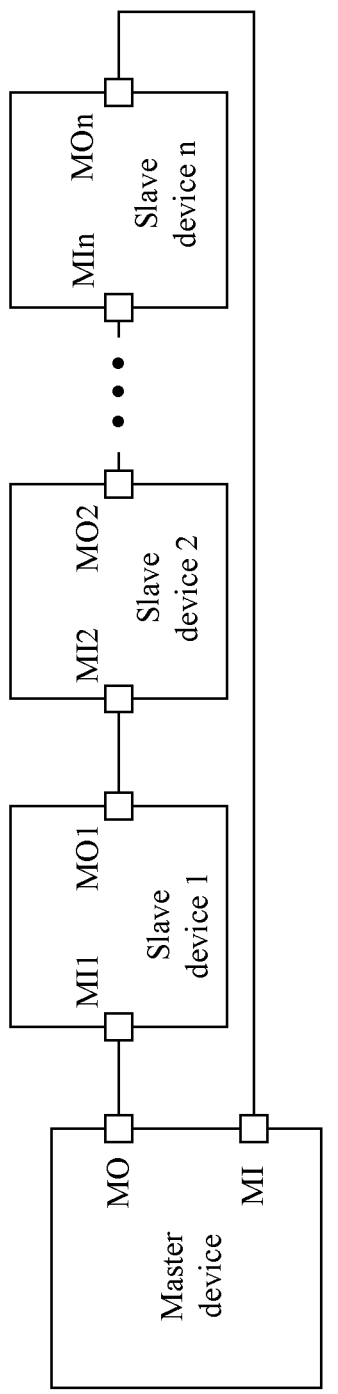
FIG. 1 is a schematic block diagram of a first example single-wire communication system, in accordance with embodiments of the present invention.

Referring now to FIG. 1, shown is a schematic block diagram of a first example single-wire communication system, in accordance with embodiments of the present invention. In this particular example, the single-wire communication system can include a master device and a plurality of slave devices. The master device and each of the plurality of slave devices can be sequentially connected through a single-wire. The master device and the plurality of slave devices may form a communication link, and the plurality of slave devices in the communication link can include slave devices 1 to an nth slave device "n," where n is a positive integer.

As exemplified herein, a chained and circular serial single-wire communication system is shown, but other arrangements can be employed in certain embodiments. In the single-wire communication system, data output terminal MO of the master device can connect to data input terminal MI1 of slave device 1, and data input terminal MI of the master device can connect to data output terminal MOn of the nth slave device n. Data output terminal MO1 of slave device 1 can connect to the data input terminal MI2 of slave device 2, and so on, and the data input terminal MIn of the nth slave device n can connect to data output terminal MOn−1 of the (n−1)th slave device n−1, thereby forming the circular communication system.

Before address initialization, the plurality of slave devices may not have any addresses. When address initialization starts, the master device can sequentially transmit an addressing command with different address data to the plurality of slave devices without being addressed according to the positions of the plurality of slave devices in the communication link. Each of the plurality of slave devices 1-*n* when receiving the addressing command may serve as a current slave device. If the current slave device has not been addressed, the address of the current slave device can be set as the address data of the addressing command. If the current slave device has been addressed, the received addressing command may be transmitted to a next slave device.

This approach may also be applied to a chained and non-circular serial single-wire communication system. In the chained and non-circular serial single-wire communication system, data output terminal MO of the master device can connect to data input terminal MI1 of slave device 1, and the data input terminals of slave device 2 to the nth slave device n can be respectively connected to data output terminals of its last slave devices (e.g., slave device 1 to the (n−1)th slave device n−1) in the communication link. Also, the data output terminals of slave device 1 to the (n−1)th slave device n−1 may be respectively connected to data input terminals of its next slave devices (e.g., slave device 2 to the nth slave device n) in the communication link.

In particular embodiments, if the current slave device has been addressed, the current slave device can be in a pass-through mode. Accordingly, the communication state between the data input terminal and the data output terminal of the current slave device can be equivalent to conductor wire connection. For example, a buffer or a switch can connect between the data input terminal and the data output terminal of the current slave device. For example, if the current slave device has been addressed, the switch can be controlled to be turned on or the buffer is controlled to be enabled. Any suitable approach that can realize that if the slave device has been addressed, the slave device is in a pass-through mode can be utilized in certain embodiments. When the master device transmits the addressing command to the slave device which finishes being addressed, the slave device which finishes being addressed can be in the pass-through mode and the addressing command transmitted by the master device can be transmitted to the slave device which is not addressed by passing through one or more slave devices which finish being addressed, thereby sequentially finishing the addressing of the plurality of slave devices.

Figure 2:
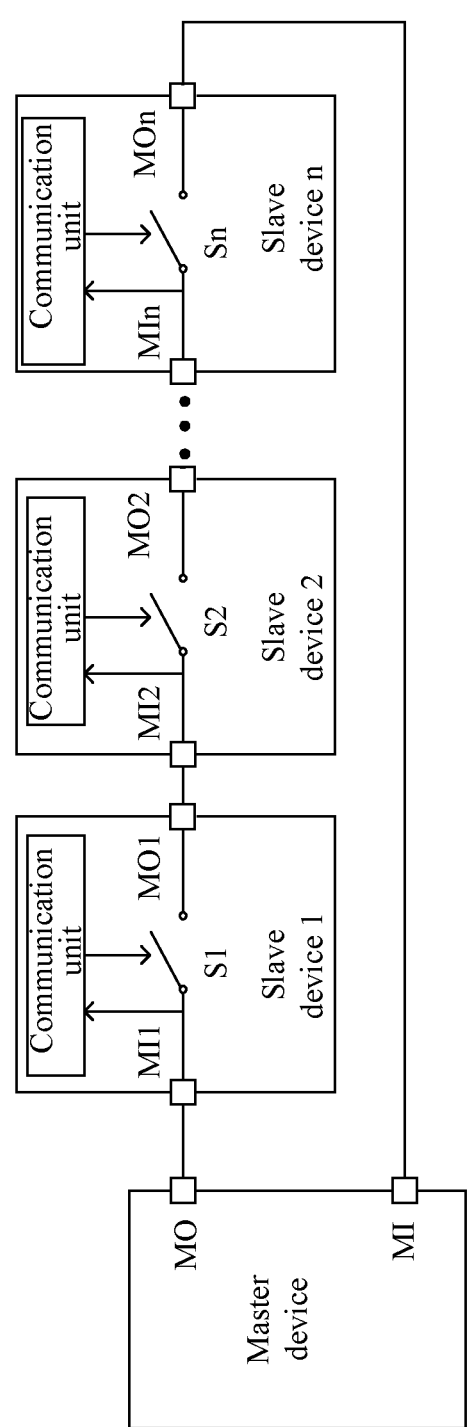
FIG. 2 is a schematic block diagram of a second example single-wire communication system, in accordance with embodiments of the present invention.

Referring now to FIG. 2, shown is a schematic block diagram of a second example single-wire communication system, in accordance with embodiments of the present invention. In particular embodiments, the single-wire communication system can include the master device and the plurality of slave devices. The master device and each of the plurality of slave devices can be sequentially connected through a single-wire. The master device and the plurality of slave devices may form the communication link, and the plurality of slave devices in the communication link can include a first slave device 1 to an nth slave device n. In the single-wire communication system, data output terminal MO of the master device can connect to the data input terminal MI1 of slave device 1, and the data input terminal MI of the master device can connect to data output terminal MOn of the nth slave device n. Data output terminal MO1 of slave device 1 can connect to the data input terminal MI2 of slave device 2, and so on, and the data input terminal MIn of the nth slave device n can connect to data output terminal MOn−1 of the (n−1)th slave device n−1, thereby forming the circular communication system.

In particular embodiments, the circular serial single-wire communication system is taken as an example but other arrangements can be employed as well. In particular embodiments, each of the plurality of slave devices can include a switch that can be coupled between the data input terminal and the data output terminal of the corresponding slave device to sequentially finish the addressing of the plurality of slave devices according to the positions of the plurality of slave devices in the communication link. When address initialization starts, the master device can transmit the addressing command, and slave device 1 may set its address as the address data of the addressing command transmitted by the master device according to the content of the addressing command. Then, switch S1 can be closed to be turned on. The master device may transmit the addressing command again, and slave device 1 may not require addressing because slave device 1 has finished being addressed. Slave device 2 can set its address as the address data of the addressing command transmitted by the master device according to the content of the addressing command, and then switch S2 can be closed to be turned on.

And so on, the master device may transmit the addressing command for the nth time, and slave device 1 to the (n−1)th slave device n−1 do not require addressing because slave device 1 to the (n−1)th slave device have finished being addressed. The nth slave device n may receive the addressing command through first slave device 1 to the (n−1)th slave device n−1, and can set its address as the address data of the addressing command transmitted by the master device according to the content of the addressing command, and then switch Sn can be closed to be turned on. The initialization of the addresses of the plurality of slave devices may continue until the nth slave device n finishes being addressed.

In particular embodiments, if the current slave device has been addressed, the current slave device can be in the pass-through mode. Accordingly, the switch between the data input terminal and the data output terminal of the current slave device can be turned on and may be equivalent to a conductor wire connection. The switch in the slave device without being addressed can be turned off. When the master device transmits the addressing command, the slave device being addressed can be in the pass-through mode, and the addressing command may be transmitted to the slave device that is not addressed by one or more slave devices thereby sequentially finishing the addressing of the plurality of slave devices.

In particular embodiments, after the address initialization finishes, the master device and each of the plurality of slave devices may implement two types of serial communication. For example, serial communication whereby switches S1 to Sn are all turned on and data output terminal MO of the master device can connect to the data input terminal of each of the plurality of slave devices. Thus, the master device may implement serial bus communication with each of the plurality of slave devices according to the address data to improve communication efficiency. In other examples are types of serial communication, the master device can connect to slave device 1, and slave device 2 can connect to slave device 1, and so on, and chained serial communication may be implemented. The chained serial communication may be similar to I2C communication, and the master device may respond to and read each of the plurality of slave devices.

Figure 3:
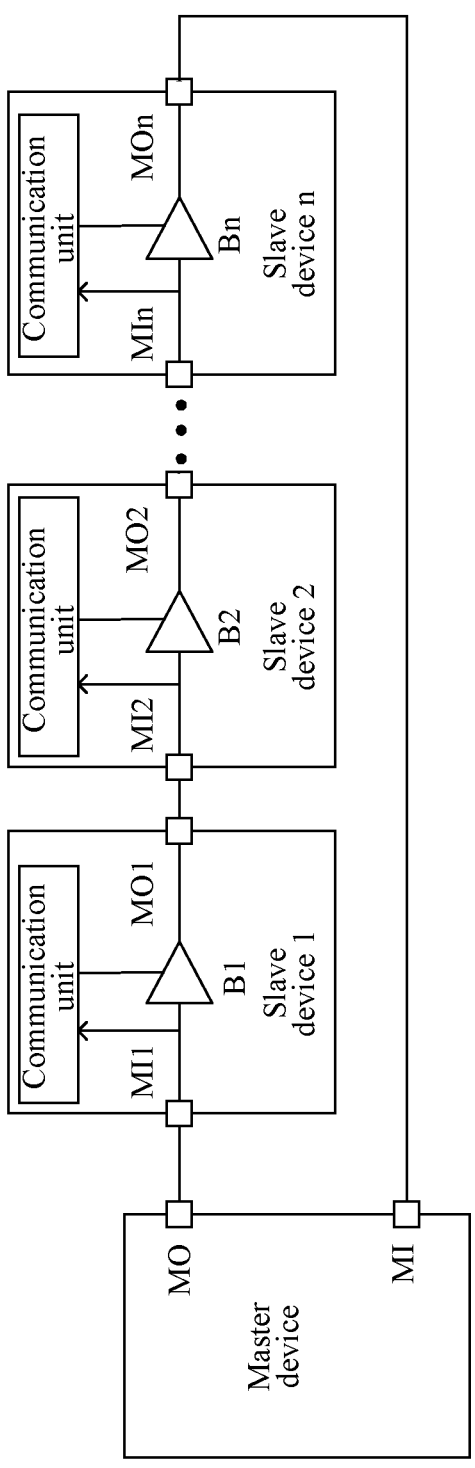
FIG. 3 is a schematic block diagram of a third example single-wire communication system, in accordance with embodiments of the present invention.

Referring now to FIG. 3, shown is a schematic block diagram of a third example single-wire communication system, in accordance with embodiments of the present invention. In this particular example, the single-wire communication system can include the master device and the plurality of slave devices, and the master device and each of the plurality of slave devices can be sequentially connected by a single-wire. The master device and the plurality of slave devices may form the communication link, and the plurality of slave devices in the communication link can include slave device 1 to an nth slave device n. The difference between the single-wire communication system shown in FIG. 3 and the single-wire communication system shown in FIG. 2 is each of the plurality of slave devices in this example may utilize a buffer to substitute the switch. The control and the communication logic of the single-wire communication system in this example may be similar to the control and the communication logic of the single-wire communication system in the second example discussed above.

In particular embodiments, if the current slave device has been addressed, the current slave device may be in the pass-through mode. Accordingly, the buffer can be enabled such that the communication state between the data input terminal and the data output terminal of the current slave device is equivalent to the conductor wire connection. Also, the buffer in the slave device without/not being addressed can be disabled. When the master device transmits the addressing command, the slave device being addressed can be in the pass-through mode, and the addressing command transmitted by the master device may be transmitted to the slave device which is not addressed by one or more slave devices being addressed, thereby sequentially finishing the addressing of the plurality of slave devices. After the address initialization finishes, the master device and the communication units of the plurality of slave devices may implement serial communication.

Figure 4:
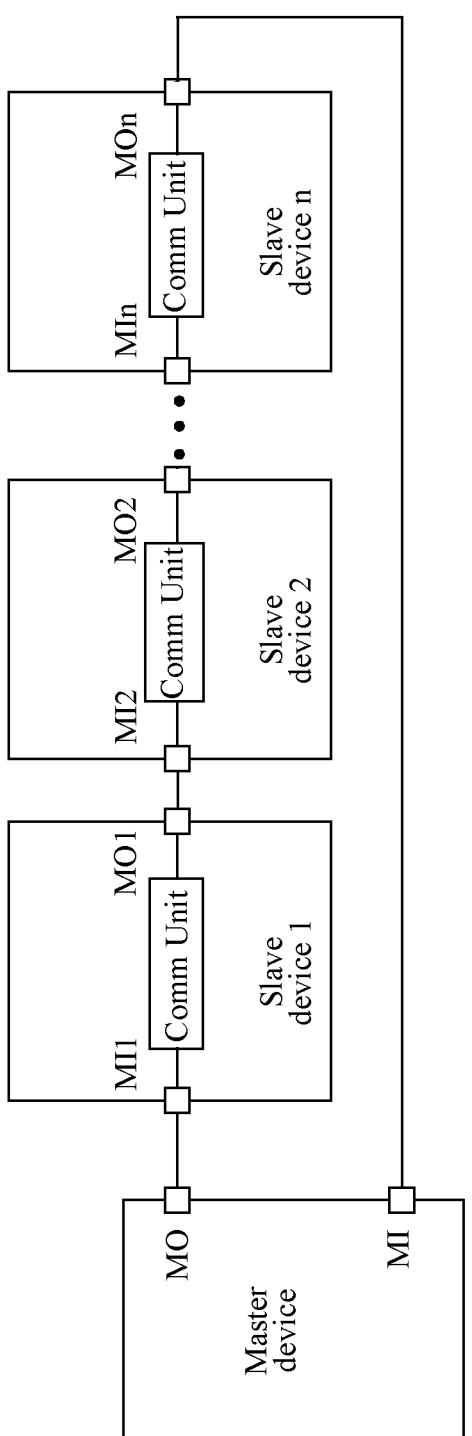
FIG. 4 is a schematic block diagram of a fourth example single-wire communication system, in accordance with embodiments of the present invention.

Referring now to FIG. 4, shown is a schematic block diagram of a fourth example single-wire communication system, in accordance with embodiments of the present invention. In particular embodiments, the single-wire communication system can include the master device and the plurality of slave devices, and the master device and each of the plurality of slave devices can be sequentially connected by a single-wire. The master device and the plurality of slave devices may form the communication link, and the plurality of slave devices in the communication link can include slave device 1 to an nth slave device n. The difference between the single-wire communication system example shown in FIG. 4 and the single-wire communication system example shown in FIG. 2 is each of the plurality of slave devices in this example includes a communication unit that is coupled between the data input terminal and the data output terminal of the corresponding slave device.

When address initialization starts, the master device may transmit the addressing command, slave device 1 may not have finished being addressed, and the communication unit of slave device 1 may not transmit its received addressing command to slave device 2. Slave device 1 can set its address as the address data of the addressing command transmitted by the master device according to the content of the addressing command. The master device may transmit the addressing command again, and the communication unit of slave device 1 may transmit the addressing command transmitted by the master device to slave device 2 because slave device 1 has finished being addressed. Slave device 2 may have not finished being addressed, and the communication unit of slave device 2 may not transmit its received addressing command to slave device 3. Slave device 2 can set its address as the address data of the addressing command transmitted by the master device according to the content of the addressing command. And so on, the master device can transmit the addressing command for the nth time, and slave device 1 to the (n−1)th slave device n−1 may not require addressing because slave device 1 to the (n−1)th slave device have finished being addressed.

The communication unit of slave device 1 can transmit the addressing command transmitted by the master device to slave device 2, the communication unit of slave device 2 may transmit the addressing command received from slave device 1 to slave device 3, and so on, the communication unit of the (n−1)th slave device n−1 may transmit the addressing command received from the (n−2)th slave device n−2 to the nth slave device n. The nth slave device n can set its address as the address data of the addressing command transmitted by the master device according to the content of the addressing command. The initialization of the addresses of the plurality of slave devices may not complete until the nth slave device n finishes being addressed.

In particular embodiments, if the current slave device has been addressed, the communication unit of the current slave device may not process the addressing command and can directly transmits the addressing command to the next slave device. Or, the communication unit of the current slave device may simply process the addressing command and not modify the address data in the addressing command, e.g., processing delay, and then transmit the addressing command to the next slave device. When the master device transmits the addressing command, the addressing command can be transmitted to the slave device which is not addressed by one or more slave devices which finish being addressed, thereby sequentially finishing the addressing of the plurality of slave devices. After the address initialization finishes, the master device and the communication units of the plurality of slave devices may implement serial communication.

Referring now to FIG. 5, shown is a flow diagram of an example single-wire communication method, in accordance with embodiments of the present invention. This particular example may be applied to the single-wire communication system, and the single-wire communication system can include a master device and a plurality of slave devices, and the master device and each of the plurality of slave devices can be sequentially connected through a single-wire. The master device and the plurality of slave devices may form a communication link. Before address initialization, the plurality of slave devices may not have any addresses. When address initialization starts, the master device can sequentially transmit the addressing command with different address data to the plurality of slave devices without being addressed according to the positions of the plurality of slave devices in the communication link. Each of the plurality of slave devices 1-$n$ when receiving the addressing command may serve as a current slave device. At S100, the addressing command may be sequentially transmitted to each of the plurality of slave devices by the master device. At S101, if the current slave device has not been addressed, the address of the current slave device can be set as the address data of the received addressing command. If the current slave device has been addressed, the received addressing command can be transmitted to the next slave device. And so on, the initialization of the addresses of the plurality of slave devices can be completed.

In particular embodiments, the single-wire communication system may sequentially perform address coding on the plurality of slave devices according to the positions of the plurality of slave devices in the communication link. Also, the master device may sequentially finish the address coding of all of the plurality of slave devices by transmitting the addressing command. Further, when data broadcasting or call transmission is performed on the latter stage, the directional data transmission may finish by inserting corresponding address data into the coding command, and the master device may perform ACK response(s) on the plurality of slave devices and may read the plurality of slave devices.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A single-wire communication method for a single-wire communication system having a master device and a plurality of slave devices, wherein the master device and the plurality of slave devices are sequentially connected in series through a single wire therebetween only each pair of devices of the master device and the plurality of slave devices, wherein each of the plurality of slave devices comprises a communication unit and a buffer coupled in parallel, and each of the communication unit and the buffer is coupled between a data input terminal and a data output terminal of a corresponding slave device, the method comprising:

a) sequentially transmitting an addressing command to each of the plurality of slave device by the master device, wherein each of the plurality of slave devices when receiving the addressing command serves as a current slave device;

b) setting an address of the current slave device as address data of the received addressing command when the current slave device has not been addressed;

c) transmitting the received addressing command to a next slave device when the current slave device has been addressed;

d) enabling the buffer such that communication channel between the data input terminal and the data output terminal of the current slave device is turned on when the current slave device finishes being addressed;

e) disabling the buffer such that the communication channel between the data input terminal and the data output terminal of the current slave device remains off when the current slave device does not finish being addressed; and f) wherein the communication channel passes through the buffer without passing through the communication unit.

2. The method of claim 1, further comprising, after the plurality of slave devices finishes being addressed, coupling a data output terminal of the master device with a data input terminal of each of the plurality of slave devices to perform serial bus communication.

3. The method of claim 1, wherein the master device and the plurality of slave devices form a communication link, the plurality of slave devices in the communication link comprises a first slave device, a second slave device, through an (N−1) th slave device and an Nth slave device, wherein N is a positive integer, the method further comprising:

a) after the plurality of slave devices completes being addressed, connecting a data output terminal of the master device to a data input terminal of the first slave device, and connecting the data output terminals of the first slave device to the (N−1) th slave device to the data input terminals of the second slave device to the Nth slave device respectively in the communication link to perform chained serial communication.

4. The method of claim 1, further comprising controlling a current slave device to be in a pass-through mode when the current slave device finishes being addressed.

5. The method of claim 4, wherein each of the plurality of slave devices comprises a switch that is coupled between a data input terminal and a data output terminal of a corresponding slave device, the method further comprising:

a) controlling the switch to be turned on when the current slave device finishes being addressed; and b) controlling the switch to remain off when the current slave device does not finish being addressed.

6. The method of claim 1, further comprising:

a) transmitting the received addressing command to the next slave device by the communication unit when the current slave device finishes being addressed; and b) wherein the communication unit does not transmit the received addressing command to the next slave device when the current slave device does not finish being addressed.

7. A single-wire communication system, comprising:

a) a master device; and b) a plurality of slave devices;

c) wherein the master device and the plurality of slave devices are sequentially connected in series through a single wire therebetween only each pair of devices of the master device and the plurality of slave devices;

d) wherein each of the plurality of slave devices comprises a communication unit and a buffer coupled in parallel, and each of the communication unit and the buffer is coupled between a data input terminal and a data output terminal of a corresponding slave device;

e) wherein the master device sequentially transmits an addressing command to each of the plurality of slave device, wherein each of the plurality of slave devices when receiving the addressing command serves as a current slave device;

f) wherein if the current slave device has not been addressed, an address of the current slave device is set as address data of the received addressing command;

g) wherein if the current slave device has been addressed, the received addressing command is transmitted to a next slave device;

h) wherein the buffer is enabled such that communication channel between the data input terminal and the data output terminal of the current slave device is turned on when the current slave device finishes being addressed;

i) the buffer is disabled such that the communication channel between the data input terminal and the data output terminal of the current slave device remains off when the current slave device does not finish being addressed; and j) wherein the communication channel passes through the buffer without passing through the communication unit.

8. The system of claim 7, wherein after the plurality of slave devices finish being addressed, a data output terminal of the master device is coupled with a data input terminal of each of the plurality of slave devices to perform serial bus communication.

9. The system of claim 7, wherein:

a) the master device and the plurality of slave devices form a communication link, the plurality of slave devices in the communication link comprise a first slave device and a second slave device through an (N-1) th slave device and an Nth slave device, wherein N is a positive integer; and b) after the plurality of slave devices finish being addressed, a data output terminal the master device is connected to a data input terminal of the first slave device, and data output terminals of the first slave device to the (N−1) th slave device is connected to the data input terminals of the second slave device to the Nth slave device respectively in the communication link to perform chained serial communication.

10. The system of claim 7, wherein the current slave device is controlled to be in a pass-through mode when the current slave device finishes being addressed.

11. The system of claim 10, wherein:

a) each of the plurality of slave devices comprises a switch that is coupled between a data input terminal and a data output terminal of a corresponding slave device;

b) wherein the switch is controlled to be turned on when the current slave device finishes being addressed; and c) the switch is controlled to remain off when the current slave device does not finish being addressed.

12. The system of claim 7, wherein:

a) the received addressing command is transmitted to the next slave device by the communication unit when the current slave device finishes being addressed; and b) the communication unit does not transmit the received addressing command to the next slave device when the current slave device does not finish being addressed.

13. The system of claim 7, wherein a data input terminal of the master device is not connected to a data output terminal of a last slave device.

14. The system of claim 7, wherein a data input terminal of the master device is connected to the data output terminal of a last slave device.

* * * * *